(12) United States Patent  (10) Patent No.: US 7,308,105 B2
Bullen  (45) Date of Patent: Dec. 11, 2007

(54) ENVIRONMENTAL NOISE MONITORING

(75) Inventor: Robert Bruce Bullen, Neutral Bay (AU)

(73) Assignee: Soundscience Pty Ltd, Crows Nest, New South Wales (AU)

( * ) Notice: Subject to any disclaimer, the term of this patent is extended or adjusted under 35 U.S.C. 154(b) by 653 days.

(21) Appl. No.: 10/189,045

(22) Filed: Jul. 2, 2002

(65) Prior Publication Data

US 2003/0039369 A1    Feb. 27, 2003

(30) Foreign Application Priority Data

Jul. 4, 2001  (AU) .................................... PR6120

(51) Int. Cl.
*H03G 3/20*      (2006.01)
(52) U.S. Cl. ........................................ 381/57
(58) Field of Classification Search ............ 381/56–58, 381/94.7, 94.1–94.2, 71.11–71.12, 92, 73.1, 381/71.7; 704/270, 233, 273; 367/124–125, 367/39–42; 348/14.08, 14.01, 14–15, 14.15
See application file for complete search history.

(56) References Cited

U.S. PATENT DOCUMENTS

| | | | |
|---|---|---|---|
| 3,723,960 A | | 3/1973 | Harris |
| 3,794,766 A | * | 2/1974 | Cox et al. ..................... 381/66 |
| 3,947,803 A | | 3/1976 | Brown |
| 4,208,735 A | | 6/1980 | Suzuki et al. |
| 4,223,311 A | | 9/1980 | Ellingson |
| 4,424,511 A | * | 1/1984 | Alberts, Jr. ................... 73/646 |
| 4,536,887 A | * | 8/1985 | Kaneda et al. ................ 381/92 |
| 4,712,429 A | * | 12/1987 | Raspet et al. ................. 73/646 |

(Continued)

FOREIGN PATENT DOCUMENTS

EP    1 108 994 A2    6/2001

(Continued)

OTHER PUBLICATIONS

"Introduction to Noise Analysis", Harris and Ledwidge, 1974, pp. 62-63.

*Primary Examiner*—Vivian Chin
*Assistant Examiner*—Lun-See Lao
(74) *Attorney, Agent, or Firm*—DLA Piper US LLP (57) ABSTRACT

This invention concerns environmental noise monitoring, and more particularly a system and method for environmental noise monitoring. The environmental noise monitoring system comprises three or more sound level transducers arranged apart from each other in an environment containing one or more noise sources. Each transducer is arranged to pick up sounds arriving from all directions and to transduce the sounds into electrical signals. The sound level and direction measuring equipment includes signal samplers connected to respective transducers to receive electrical signals representing environmental sounds and to sample the electrical signals. A computer processor is further provided to perform cross correlation calculations to generate a cross correlation function for each pair of sampled signals. The processor identifies local maxima in the cross correlation functions, estimates the angle of arrival of the sound associated with a local maximum and the sound pressure level associated with the maximum, and uses the estimates of the angles from all cross correlation functions to identify a source of noise in a particular direction and the level of noise from that source, and then identifies additional sources of noise in different directions and the levels of noise from those sources. Noise levels from sources in particular directions may be accumulated, displayed and saved for reference.

23 Claims, 4 Drawing Sheets

U.S. PATENT DOCUMENTS

| | | |
|---|---|---|
| 4,910,719 A | 3/1990 | Thubert |
| 5,086,415 A | 2/1992 | Takahashi et al. |
| 5,161,127 A | 11/1992 | Grosch |
| 5,235,341 A | 8/1993 | Effland et al. |
| 5,724,485 A * | 3/1998 | Rainton ................ 395/20 |
| 5,834,647 A * | 11/1998 | Gaudriot et al. ........... 73/570 |
| 6,009,396 A * | 12/1999 | Nagata ................ 704/270 |
| 6,130,949 A * | 10/2000 | Aoki et al. ............. 381/94.3 |
| 6,160,758 A * | 12/2000 | Spiesberger ............ 367/125 |
| 6,198,693 B1 | 3/2001 | Marash |
| 6,304,515 B1 * | 10/2001 | Spiesberger ............ 367/124 |
| 2002/0097885 A1 * | 7/2002 | Birchfield et al. .......... 381/92 |

FOREIGN PATENT DOCUMENTS

| | | |
|---|---|---|
| JP | 11-153659 | 6/1999 |
| JP | 11-248812 | 9/1999 |
| WO | WO 97/14051 | 4/1997 |

\* cited by examiner

ENVIRONMENTAL NOISE MONITORING

RELATED APPLICATION DATA

This application claims benefit under 35 USC §119(a) to Australian Provisional Patent Application Ser. No. PR 6120, filed Jul. 4, 2001, which is incorporated herein by reference in its entirety.

FIELD OF THE INVENTION

The invention concerns environmental noise monitoring, and more particularly a system and method for environmental noise monitoring. In a further aspect the invention is sound level and direction detecting equipment for use in the system.

BACKGROUND OF THE INVENTION

Monitoring environmental noise, for instance in the vicinity of factories or mines, usually requires the installation of sound level measuring equipment. Monitoring may be required over relatively long periods of time, for instance from a few days to several months. It is usual to connect a recording device, or noise logger, to the sound level measuring equipment and to leave it unattended to generate a record of the levels of environmental noise measured by the equipment.

Where a person attends the equipment, all characteristics, including the sources and directions of noise, can be recorded by the person in addition to the levels. However, it is generally considered impractical to have a person attending noise monitoring over relatively long periods of time.

There have been limited experiments to record noise levels using a dummy human head, in an attempt to allow listeners to later judge the direction of recorded sounds. However, these experiments have been unsuccessful to date, and the proposal appears to be impractical due to the both the difficulties of leaving a dummy human head unattended, and the time required for post processing of any sound level data collected.

Sound intensity monitors indicate a resultant sound intensity taking into account all noise sources at a particular point in time. Accordingly, if two equivalent noise sources are positioned on opposite sides of a sound intensity monitor, the resultant sound intensity would be zero. While these devices do provide a form of directional indication, they have not been found suitable for environmental noise monitoring.

Similarly, a directional microphone can indicate the sound signal arising from a specific direction but generally cannot be calibrated to produce an accurate measurement of the sound level arising from that direction.

In principle, a microphone with a parabolic reflector could be calibrated to produce an accurate measurement of the sound level of noise arising from a particular direction. However, any such microphone and reflector would need to be continuously rotated in a substantially horizontal plane to detect sound from all directions. Additionally, the size of the reflector would need to be comparable with the longest wavelength to be detected, and for sound at frequencies down to 100 Hz would result in a reflector with dimensions in excess of 3 meters. Such a system has obvious practical difficulties.

SUMMARY OF THE INVENTION

In one aspect, the invention is an environmental noise monitoring system, comprising:
three or more sound level transducers arranged apart from each other in an environment containing one or more noise sources, each transducer is arranged to pick up sounds arriving from any direction and to transduce the sounds into electrical signals;
sound level and direction measuring equipment, including: signal samplers connected to respective transducers to receive electrical signals representing environmental sounds and to sample the electrical signals, whereby pairs of sampled signals are formed with each pair representing sampled signals from two of the three or more sound level transducers; and a computer processor to:
perform cross correlation calculations to generate a cross correlation function for each pair of sampled signals, identify local maxima in each cross correlation function;
determine two possible sound arrival directions with respect to a fixed directional system for each identified local maximum;
determine sets of possible arrival directions for each pair of transducers;
find matches whereby the same arrival direction appears in all determined sets to within a predetermined tolerance; and
determine, for each match, the sound pressure level of an associated noise source based on values of the cross-correlation functions at the associated local maxima.

This technique allows for measurement of the level of noise arising from noise sources in any direction.

The sound transducers may be microphones and where three microphones are used, they may be arranged in a nominal triangular configuration when viewed from above. Further, the microphones may be spaced apart from each other by a distance of between 0.5 to 10 meters.

The sound signals produced by each microphone over a period of 200 ms to 1 second may be collected simultaneously, and sampled by respective signal samplers at the rate of at least 44,100 samples per second with at least a 24 bit resolution, to produce sampled signals. The sampled signals may be provided to the computer processor where cross correlation calculations are performed between each pair of sampled signals to produce cross correlation functions. Local maxima in these functions represent possible noise sources. The delay time at the local maximum is related to the direction of the source, and the value of the cross-correlation is related to the noise level.

The arrival angles corresponding to each maximum may be determined in relation to a fixed directional system. For each maximum there are two possible arrival angles, representing the same angle of incidence of a sound wave front from either side of a microphone-to-microphone axis. These angles may be given, by $$\alpha = \phi \pm \cos^{-1}(\delta c/D) \qquad (1)$$

where $\delta$ is the time delay at the local maximum, c is the speed of sound, D is the separation distance between the two microphones and $\phi$ is the angle between the microphone axis and a reference direction.

The two arrival angles corresponding to each possible delay time for each microphone pair may be pre-computed and stored to allow faster real-time processing. If a maximum is found in the cross-correlation function between microphone signals i and j at delay time $\delta_{ij}$, the sound pressure level of the corresponding source may be estimated as:

$$\text{Sound Pressure Level} = 10 \log_{10}((V_i V_j)^{1/2} CC((\delta_{ij}))). \quad (2)$$

where $V_i$, $V_j$ are the variances of the sound pressure at microphones i and j referenced to the standard base of $2 \times 10^{-5}$ Pa; and $CC(\delta)$ is the cross-correlation function for the two signals.

When there are local maxima in all functions for which one of the two possible arrival angles match, to within a pre-determined tolerance, a noise source can be said to have been identified. Several sources may be identified from a single set of cross-correlations, by matching different local maxima in the functions.

The directions and sound pressure levels of identified noise sources may be stored and displayed for each sample period. Noise sources that are identified consistently in a series of samples as arriving from a particular direction may be taken to be identified with a high level of confidence. The equivalent-continuous noise level of such sources may then be more accurately estimated by:

$$\text{Sound Pressure Level} = 10 \log_{10}((1/N) \Sigma 10^{L_i/10}) \quad (3)$$

where $L_i$ is the $i^{th}$ estimate of the sound level, derived as described above and N is the number of estimates.

The noise levels associated with identified sources within specified ranges of angle may be accumulated over a period of time (typically five minutes), according to equation (3), and may be presented in a chart where the level of noise recorded from any direction is represented as an island. The radial distance of island from the centre of the chart represents the noise level in dBA, and the islands may also be colour coded to highlight specific angle ranges. The direction of the noise source may be graphically represented according to the points of a compass, with a resolution of five-degrees. Circles may be drawn on the chart to show particular noise levels.

In addition, if short-term accumulated noise levels are saved over a longer period, such as 24 hours, a range of angles may be selected and the noise level arriving from sources in this range can be charted against time, together with the noise level from all identified noise sources; and the total noise level.

In another aspect, the invention is a method of monitoring environmental noise, the method comprising the steps of:

using each of three or more sound level transducers arranged apart from each other in an environment containing one or more noise sources, to pick up sounds arriving from any direction;

transducing the sounds into electrical signals;

sampling the electrical signals;

forming pairs of sampled signals, each pair representing sampled signals from two of the three or more sound level transducers;

performing cross correlation calculations to generate a cross correlation function for each pair of sampled signals;

performing cross correlation calculations to generate a cross correlation function for each pair of sampled signals;

identifying local maxima in each cross correlation function;

determining two possible sound arrival directions with respect to a fixed directional system for each identified local maximum;

determining sets of possible arrival directions for each pair of transducers;

finding matches whereby the same arrival direction appears in all determined sets to within a predetermined tolerance; and determining, for each match, the sound pressure level of an associated noise source based on values of the cross-correlation functions at the associated local maxima.

In a further aspect, the invention is sound level and direction measuring equipment, the equipment comprising: signal samplers connected to respective sound level transducers to receive electrical signals representing environmental sounds and to sample the electrical signals, whereby pairs of sampled signals are formed with each pair representing sampled signals from two of three or more sound level transducers; and a computer processor to:

perform cross correlation calculations to generate a cross correlation function for each pair of sampled signals;

identify local maxima in each cross correlation function;

determine two possible sound arrival directions with respect to a fixed directional system for each identified local maximum;

determine sets of possible arrival directions for each pair of transducers; find matches whereby the same arrival direction appears in all determined sets to within a predetermined tolerance; and determine, for each match, the sound pressure level of an associated noise source based on values of the cross-correlation functions at the associated local maxima.

BRIEF DESCRIPTION OF THE DRAWINGS

An example of the invention will now be described with reference to the accompanying drawings, in which.

DETAILED DESCRIPTION OF A PREFERRED EMBODIMENT OF THE INVENTION

Figure 1:
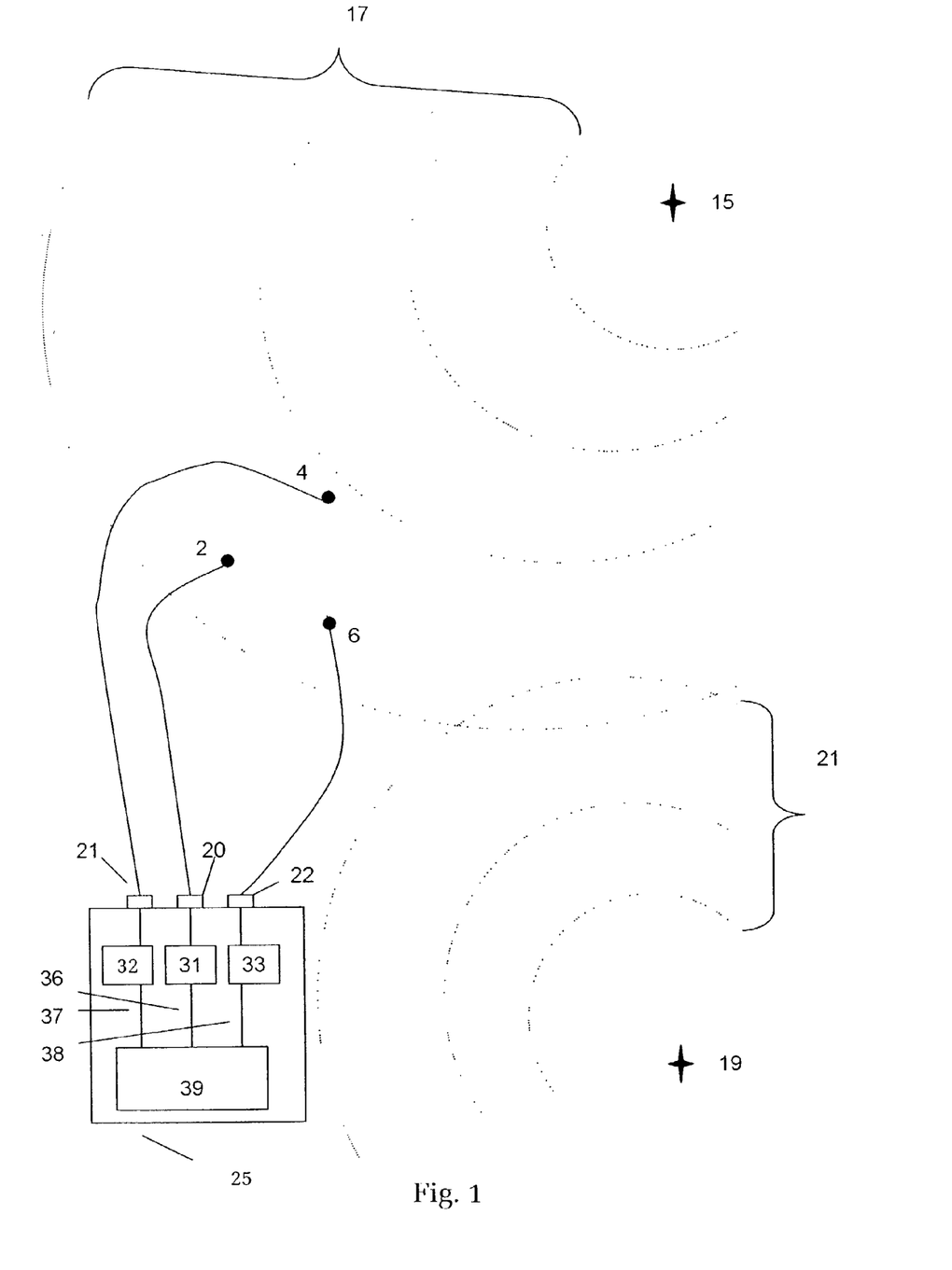
FIG. 1 is a diagrammatic plan view of an environmental noise monitoring system.

FIG. 1 shows the system comprising three omni-directional microphones 2, 4 and 6 located in an area that is relatively free of obstructions or reflecting surfaces. The three microphones 2, 4 and 6 are arranged apart from each other, at the vertices of a nominal equilateral triangle when viewed in plan, and the length of the sides of the triangle is between 0.5 and 10 meters.

Two separate sound sources 15 and 19 are located near the microphone installation. The noise sources propagate respective wave fronts 17 and 21. Noise arriving at the installation from these sources will arrive at each microphone 2, 4 and 6 at a different time. The pattern of time delays between the sound signals received at each respective microphone contains information about the direction of the incoming sound. However, the electrical signals produced by each microphone will represent the combination of all sound arriving at the microphone at that each instant, regardless of its direction of origin. In addition, it is most likely that a general background noise will also be present, the background noise arriving from no specific direction.

The microphones 2, 4 and 6 are each connected to a respective data port 20, 21, 22 of a computer-controlled recording device 25. The sound signals produced by each microphone over a period of 200 ms to 1 second are collected simultaneously, and sampled by respective signal samplers 31, 32 and 33 at the rate of 44,100 samples per second with a 24 bit resolution, to produce sampled signals 36, 37 and 38.

The sampled signals are provided to a mathematical processor 39 in the computer where cross correlation calculations are performed between each pair of sampled signals, namely, microphones 2-4, microphones 4-6, and microphones 6-2 to produce three cross correlation functions. With an arrangement of four microphones there are six sets of correlations. Use of more microphones results in a further increased number of cross correlations. The results are processed and saved or displayed while the sound signals produced by the next period are being collected.

The cross correlation functions can be used to determine the directions of noise sources, such as 15 and 19, as well as the noise level arriving from each source.

First, local maxima in each of the cross correlation functions are identified. Maxima in the cross correlation functions correspond to time delays in the sounds reaching each microphone. If the distance between the $i_{th}$ pair of microphones is $D_1$, the inter microphone delays may range from $-D_i/c$ to $+D_i/c$, where c is the speed of sound. In the case shown in FIG. 1, at least two local maxima would be expected in each cross-correlation function, representing inter-microphone delay times corresponding to the direction of arrival of sound from sources 15 and 19. Provided that the sources are sufficiently far from the microphone installation, the value of the cross-correlation function at these local maxima is related to the relative strength of sources 15 and 19 at the measurement location.

Maxima in the cross correlation functions may, however, also arise from auto correlation of the sound signal itself, or may simply result from random fluctuations in the cross correlation function.

Figure 2:
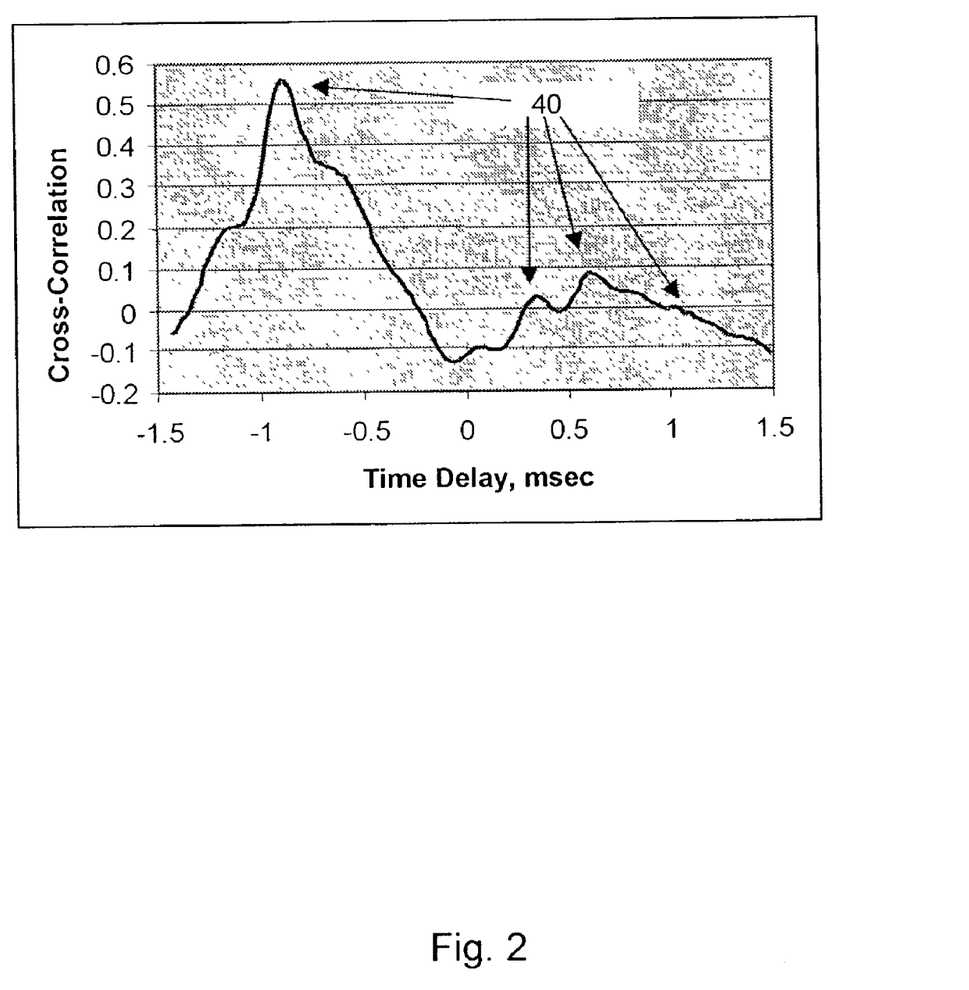
FIG. 2 is a representation of the cross-correlation function between the noise signals at two of the microphones in the system shown in FIG. 1.

FIG. 2 shows a representative cross-correlation function for two microphones. In this example there are four local maxima 40, with varying strengths, each of which may or may not represent a source of sound in a specific direction. Note that local maxima for which the value of the cross-correlation is negative may be ignored. A negative correlation between two microphone signals cannot arise directly from delay between arrival times of the sound wave fronts, and is most likely due either to autocorrelation of the signal, or to random variation.

After computation of the cross-correlation functions, the first step in data analysis is detection of all local maxima in each function. The arrival angles corresponding to each maximum are determined in relation to a fixed directional system (e.g. angle with respect to true north). For each maximum there are two possible arrival angles, representing the same angle of incidence of a sound wave front from either side of a microphone-to-microphone axis. These angles are given, using well-known formulae, by $$\alpha = \phi \pm \cos^{-1}(\delta c/D_i) \tag{1}$$

where $\delta$ is the time delay at the local maximum and $\phi$ is the angle between the microphone axis and the reference direction. This formula is valid, to within 1°, where the distance from the source to the midpoint of the two microphones is greater than twice the inter-microphone distance.

In practice, because the noise signal is digitally sampled, there are a finite number of possible delay times for each microphone pair, the number being equal to $2RD_i/c$ where R is the sample rate. The two arrival angles corresponding to each possible delay time for each microphone pair can be pre-computed and stored to allow faster real-time processing.

If a maximum is found in the cross-correlation function between microphone signals i and j at delay time $\delta_{ij}$, the sound pressure level of the corresponding source may be estimated as:

$$\text{Sound Pressure Level} = 10 \log_{10}((V_i V_j)^{1/2} CC(\delta_{ij})) \tag{2}$$

where $V_i$, $V_j$ are the variances of the sound pressure at microphones i and j referenced to the standard base of $2 \times 10^{-5}$ Pa; and $CC(\delta)$ is the cross-correlation function for the two signals.

The arrival angles corresponding to local maxima in each of the three cross correlation functions are compared. A possible source is indicated when there are local maxima in all three functions for which one of the two possible arrival angles match, to within a pre-determined tolerance. Several such "matches" may be found from a set of cross-correlations, indicating a number of noise sources.

Preferably, any local maximum would be associated with only one noise source, even if (as may occur) the associated arrival angles may form a "match" with more than one combination of local maxima in the other cross-correlation functions. The procedure used to resolve such conflicts is:

i. determine all "matches"—that is, sets of three local maxima which are such that by choosing one of the two possible arrival angles in each case, the three angles are equal, to within the specified tolerance;

ii. sort these "matches" in order of the sound pressure level which would be associated with the noise source. This is found from equation (2), taking the arithmetic mean of the three values computed from the three microphone pairs;

iii. beginning with the highest sound level, assign these "matches" as noise sources. When a local maximum in any cross-correlation has been assigned to a source, all lower-order "matches" containing this maximum are removed from the list;

iv. continue until either the list of "matches" is exhausted, or the total noise level from all assigned sources would exceed the actual total sound pressure level calculated directly from the microphone signals. (Experience indicates that this latter condition occurs very rarely - it indicates that some of the "matches" in the list must not represent actual sound sources.)

The accuracy of the above procedure clearly depends on the selected angle tolerance within which arrival directions are assumed to "match". Experience indicates that a tolerance of between 5 and 10 degrees allows all real sources to be detected, with a relatively low incidence of "detection" of artefactual noise sources.

The above procedure applies only for noise source located at distances from the microphone array which are greater than about five times the inter-microphone spacing. At closer distances, equation (1) for determining the source angle becomes inaccurate, and needs to be replaced by formulae involving the actual distance to each microphone pair. In a refinement of the technique, the above procedure can be repeated using source angles calculated based on these more accurate formulae, for various "trial" distances from the source to the centroid of the microphone array. This generates a larger set of "matches", involving sources at different distances as well as different angles. With a matching tolerance of 5 to 10 degrees, a significant number of artefactual sources can be generated, and attempts to apply this technique have at this point had limited success. However, in future, more advanced digital sampling technology may allow the tolerance to be reduced to the point where detection of sources closer than five times the inter-microphone spacing is feasible.

The directions and sound pressure levels of identified noise sources are stored and displayed for each sample. With currently available signal processing speeds, for three microphones and a sample time of one second, samples can be processed and saved while the next sample is being collected, giving a continuous real-time display of noise sources and directions. This also provides a recording of the level of all noise reaching the microphones, and the noise level recorded as being due to identified sources in any specified direction. Noise sources that are identified consistently in a series of samples as arriving from a particular direction may be taken to be identified with a high level of confidence. The noise level of such sources may then be more accurately estimated by:

$$\text{Sound Pressure Level} = 10 \, \text{Log}_{10}((1/N)\Sigma 10^{Li/10}) \quad (3)$$

where $L_i$ is the $i^{th}$ estimate of the sound level, derived as described above, and N is the number of estimates.

In any particular application, the optimal distance between microphones will depend upon a number of factors including:

the frequency of sound to be measured;

the time variation in noise level from the sound source;

the distance of the source from the monitor; and the available sample rate from the analog to digital sampling device usd.

In instances where there is a large spread of sound frequencies, fast variations in time signature and a relatively slow sample rate, a larger microphone separation may be desirable.

However, for separations greater than approximately 5 meters, the sound signal may be significantly influenced by ground effects between the microphones thus rendering cross correlations less reliable. Ground effects may be reduced by elevating microphones above ground level however, the recorded noise may then not correspond to that which would be heard by humans working or operating in that region. In addition, for practical reasons a microphone separation of 1 m or less is very desirable, allowing the three microphones to be mounted on a single stand. This provides much better control of the inter-microphone distance, as well as easier and faster set-up of the equipment. In addition, because of the limitation that identified sources should be at a distance of at least five times the inter-microphone spacing, smaller spacings allow detection of closer sources.

In applications to date, a microphone separation of 500 mm has proved effective in identifying the source of typical environmental noises.

The system and method of the present invention lends itself to estimating the direction of noise sources in three dimensions. This application may be useful for detection of aircraft noise and in this case a three dimensional array of microphones in a tetrahedral configuration may be used.

Figure 3:
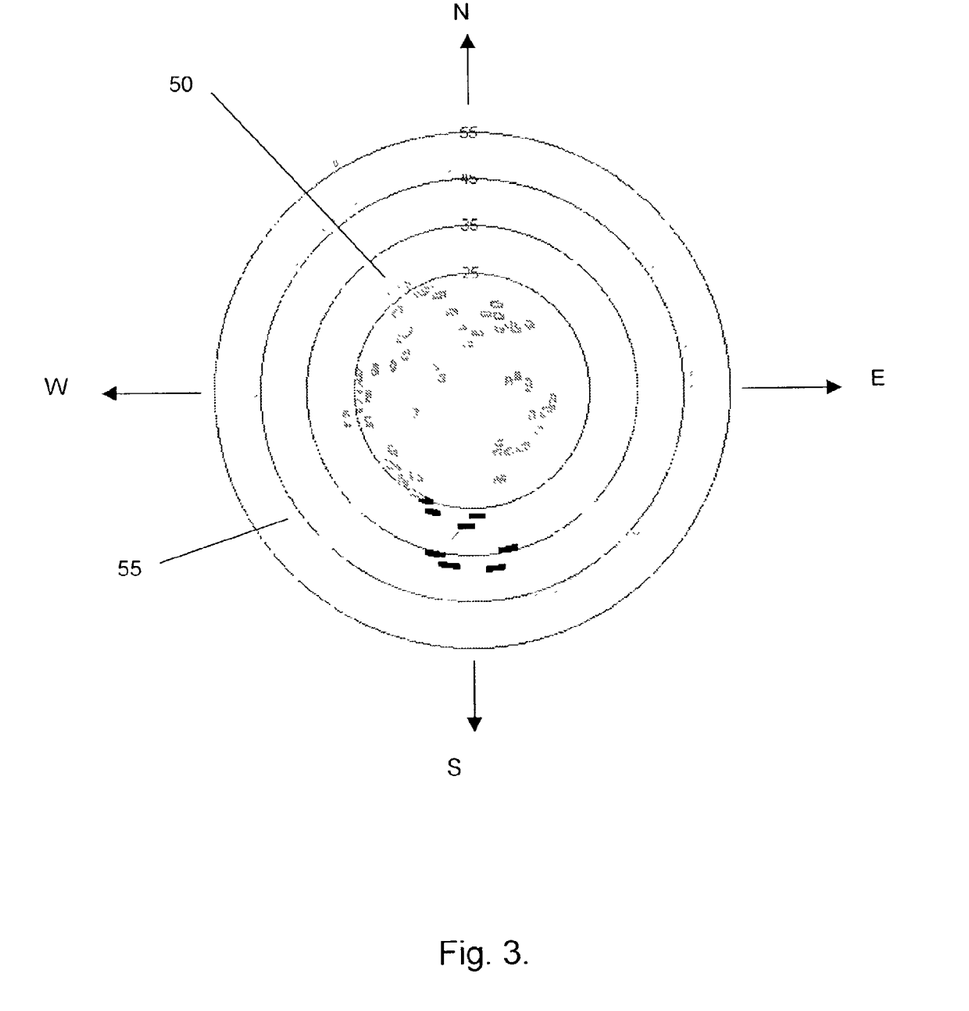
FIG. 3 is a graphical representation of the noise recorded by the system of FIG. 1, over a five-minute period, showing the total noise and the noise from each identified noise source around the system.

The noise levels associated with identified sources within specified ranges of angle are accumulated over a period of time (typically five minutes), according to equation (3). At this point, the accumulated noise level arriving from each angle range can be saved, typically in a database or similar data structure. These levels may then be presented in a chart such as FIG. 3, where the level of noise recorded from a five-degree range of angles is represented as an island 50. The radial distance of island 50 from the centre of the chart represents the noise level in dBA, the islands may also be colour coded to highlight specific angle ranges. Circles may be drawn on the chart to show the 25 dBA, 35 dBA, 45 dBA and 55 dBA noise levels. Island 50 can therefore be seen to be north west of the microphone installation and to be generating just over 25 dBA during this five minute interval. A thick circle 55 shows total measured noise level, in this case just over 45 dBA.

Figure 4:
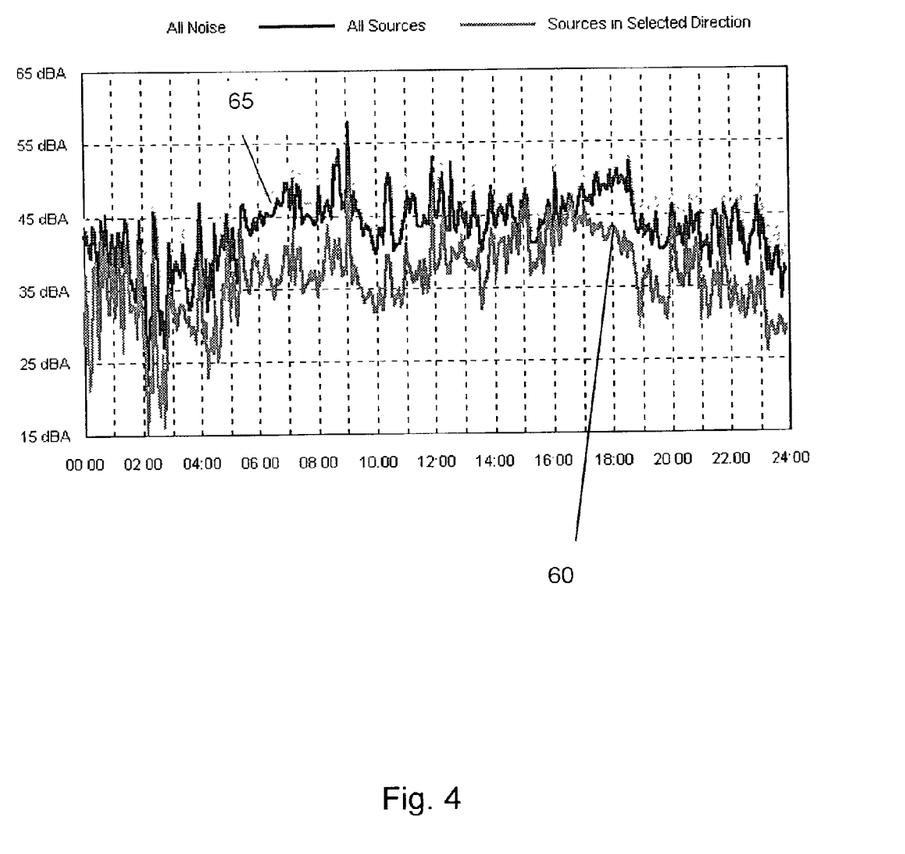
FIG. 4 is another graphical representation of the noise recorded by the system of FIG. 1 over a 24 hours period, showing the total noise level measured, the noise level from all identified sources around the system and the noise level arriving from a selected direction.

In addition, if short-term accumulated noise levels are saved over a longer period, such as 24 hours, a range of angles may be selected and the noise level arriving from sources in this range can be charted against time, as illustrated in FIG. 4. If, for example, the selected angle range 60 corresponds with a known noise source, a chart such as FIG. 4 allows automatic determination of the level of noise arriving from the same direction as the source, over time. The chart also shows the noise level from all identified noise sources 65; and the total noise level. Such information is valuable in applications including checking of compliance with noise regulations, and determining which of several possibilities is the source of an annoying noise.

The system also lends itself to real-time applications in which both the level and direction of noise at a monitor are transmitted continuously to a control station. When the level of noise arriving from a particular direction exceeds a pre-set threshold, an alarm can be generated, ensuring that steps are taken to control the source of the noise.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. An environmental noise monitoring system, comprising:

three or more sound level transducers arranged apart from each other in an environment containing one or more noise sources, each transducer is arranged to pick up sounds arriving from any direction and to transduce the sounds into electrical signals;

sound level and direction measuring equipment, including: signal samplers connected to respective transducers to receive electrical signals representing environmental sounds and to sample the electrical signals, whereby pairs of sampled signals are formed with each pair representing sampled signals from two of the three or more sound level transducers; and a computer processor to:

perform cross correlation calculations to generate a cross correlation function for each pair of sampled signals, identify local maxima in each cross correlation function;

determine two possible sound arrival directions with respect to a fixed directional system for each identified local maximum;

determine sets of possible sound arrival directions for each pair of sound level transducers in each cross-correlation function;

compare the determined sets of possible sound arrival directions to find matches whereby the same sound arrival direction appears in determined sets of each cross-correlation function to within a predetermined tolerance and thereby indicate the direction of the one or more noise sources; and determine, for each match found, the sound pressure level of an associated noise source based on values of the cross-correlation functions at the associated local maxima.

2. A system according to claim 1, wherein the sound level transducers are microphones, and three microphones are arranged in a triangular configuration.

3. A system according to claim 2, wherein the microphones are arranged between 0.5 meters and 10 meters apart.

4. A system according to claim 1, wherein the electrical signals are received simultaneously and sampled over a period between 200 ms and 1 second.

5. A system according to claim 1, wherein the signal samplers sample at a rate of at least 44,100 Hz and with at least 24 bit resolution.

6. A system according to claim 1, wherein the arrival directions are pre-computed and stored for faster real-time processing.

7. A system according to claim 1, wherein the sound level transducers comprise a three dimensional array arranged in a tetrahedral configuration.

8. A method of monitoring environmental noise, the method comprising the steps of:

using each of three or more sound level transducers arranged apart from each other in an environment containing one or more noise sources, to pick up sounds arriving from any direction;

transducing the sounds into electrical signals;

sampling the electrical signals;

forming pairs of sampled signals, each pair representing sampled signals from two of the three or more sound level transducers;

performing cross correlation calculations to generate a cross correlation function for each pair of sampled signals;

identifying local maxima in each cross correlation function;

determining two possible sound arrival directions with respect to a fixed directional system for each identified local maximum;

determining sets of possible sound arrival directions for each pair of sound level transducers in each cross-correlation function;

comparing the determined sets of possible sound arrival directions to find matches whereby the same sound arrival direction appears in determined sets of each cross-correlation function to within a predetermined tolerance thereby indicating the direction of the one or more noise sources; and determining, for each match found, the sound pressure level of an associated noise source based on values of the cross-correlation functions at the associated local maxima.

9. A method according to claim 8, wherein the electrical signals are sampled over a period between 200 ms and 1 second.

10. A method according to claim 8 wherein the electrical signals are sampled at a rate of at least 44,100 Hz, with at least 24 bit resolution.

11. A method according to claim 8, wherein the predetermined tolerance is between 5 degrees and 10 degrees.

12. A method according to claim 8, wherein the arrival directions and sound pressure levels of the noise sources are stored and displayed for each sample period.

13. A method according to claim 12, wherein the sound pressure levels associated with the noise sources within specified ranges of arrival direction are accumulated over a period of time.

14. A method according to claim 13, wherein the period of time is five minutes.

15. A method according to claim 8, wherein the arrival directions are pre-computed.

16. A method according to claim 8, wherein there are three transducers arranged in a triangular configuration.

17. A method according to claim 16, wherein the transducers are arranged between 0.5 meters and 10 meters apart.

18. A method according to claim 8, wherein the sound level transducers comprise a three dimensional array arranged in a tetrahedral configuration.

19. A method according to claim 8 further comprising:

sorting the matches in order of sound pressure level associated with respective noise source;

beginning with the highest sound pressure levels, assigning the corresponding matches as noise sources;

when a local maximum in any cross-correlation function has been assigned to a noise source, removing all lower-order matches containing the said local maximum; and proceeding until either the matches are exhausted or the total noise level from all assigned noise sources exceeds the total sound pressure level calculated directly from the signals from the three or more transducers.

20. Sound level and direction measuring equipment, the equipment comprising:

signal samplers connected to respective sound level transducers to receive electrical signals representing environmental sounds and to sample the electrical signals, whereby pairs of sampled signals are formed with each pair representing sampled signals from two of three or more sound level transducers; and a computer processor to:

perform cross correlation calculations to generate a cross correlation function for each pair of sampled signals;

identify local maxima in each cross correlation function;

determine two possible sound arrival directions with respect to a fixed directional system for each identified local maximum;

determine sets of possible sound arrival directions for each pair of sound level transducers in each cross-correlation function;

compare the determined sets of possible sound arrival directions to find matches whereby the same sound arrival direction appears in determined sets of each cross-correlation function to within a predetermined tolerance and thereby indicate the direction of the one or more noise source; and determine, for each match found, the sound pressure level of an associated noise source based on values of the cross-correlation functions at the associated local maxima.

21. Equipment according to claim 20, wherein the signal samplers sample the electrical signals over a period between 200 ms and 1 second.

22. Equipment according to claim 20 wherein the signal samplers sample the electrical signals at a rate of at least 44,100 Hz, with at least 24 bit resolution.

23. A system according to claim 20, wherein the arrival directions are pre-computed and stored for faster real-time processing.

* * * * *